(12) United States Patent
Yoo

(10) Patent No.: US 11,895,983 B2
(45) Date of Patent: Feb. 13, 2024

(54) MAT FOR A COMPANION ANIMAL

(71) Applicant: OCEANFLOW Inc., Suwon-si (KR)

(72) Inventor: Bada Yoo, Suwon-si (KR)

(73) Assignee: OCEANFLOW INC., Suwon-si (KR)

( * ) Notice: Subject to any disclaimer, the term of this patent is extended or adjusted under 35 U.S.C. 154(b) by 230 days.

(21) Appl. No.: 17/150,493

(22) Filed: Jan. 15, 2021

(65) Prior Publication Data

US 2021/0368736 A1 Dec. 2, 2021

(30) Foreign Application Priority Data

May 26, 2020 (KR) .......................... 10-2020-0062775

(51) Int. Cl.
| | | |
|---|---|---|
| *A01K 1/015* | (2006.01) | |
| *A01K 1/035* | (2006.01) | |
| *B32B 5/02* | (2006.01) | |
| *B68G 7/10* | (2006.01) | |
| *D06N 3/00* | (2006.01) | |
| *D06M 15/05* | (2006.01) | |
| *D06M 15/27* | (2006.01) | |

(52) U.S. Cl.
CPC .......... *A01K 1/0353* (2013.01); *A01K 1/0157* (2013.01); *B32B 5/024* (2013.01); *B68G 7/10* (2013.01); *D06M 15/05* (2013.01); *D06M 15/27* (2013.01); *D06N 3/0013* (2013.01); *B32B 2255/02* (2013.01); *B32B 2255/26* (2013.01); *B32B 2307/7265* (2013.01)

(58) Field of Classification Search
CPC .... A01K 1/0353; A01K 1/035; A01K 1/0157; B32B 27/12; B32B 2471/04; B32B 2307/56; B32B 2266/12; A47C 27/085; A47C 27/10; A47C 27/15; A47G 2009/008
See application file for complete search history.

(56) References Cited

U.S. PATENT DOCUMENTS

2021/0195865 A1* 7/2021 Wang .................... B32B 5/18

FOREIGN PATENT DOCUMENTS

| CN | 102862346 A | * | 1/2013 |
|---|---|---|---|
| JP | 2002173671 A | * | 6/2002 |
| JP | 2005-80630 | | 3/2005 |
| JP | 3174826 U | * | 4/2012 |
| JP | 2019143037 A | * | 8/2019 |
| JP | 2019180837 A | * | 10/2019 |
| KR | 10-1327484 | | 11/2013 |

(Continued)

OTHER PUBLICATIONS

Espacenet translation of JP-3174826-U. (Year: 2012).*

(Continued)

*Primary Examiner* — Jeremy R Pierce
*Assistant Examiner* — Christine X Nisula
(74) *Attorney, Agent, or Firm* — KILE PARK REED & HOUTTEMAN PLLC

(57) ABSTRACT

The present disclosure relates to a mat for a companion animal, and the mat includes an outer cover surrounding an outside of the mat; a double-layered fabric disposed on an inside of the outer cover to prevent contraction or bursting thereof; a cool gel made of an edible material, which is disposed on an inside of the double-layered fabric to maintain a low temperature state thereof; and coating layers coated on a surface of the outer cover.

2 Claims, 5 Drawing Sheets

(56) References Cited

FOREIGN PATENT DOCUMENTS

KR     10-1510209     4/2015
KR     10-1903603     10/2018

OTHER PUBLICATIONS

Espacenet translation of JP-2002173671-A. (Year: 2002).*
Espacenet translation of JP-2019180837-A. (Year: 2019).*
Espacenet translation of JP-2019143037-A. (Year: 2019).*
Espacenet translation of CN-102862346-A. (Year: 2013).*

* cited by examiner

MAT FOR A COMPANION ANIMAL

CROSS-REFERENCE TO RELATED APPLICATION

This application claims priority to and the benefit of Korean Patent Application No. 10-2020-0062775 filed in the Korean Intellectual Property Office on May 26, 2020, the entire contents of which are incorporated herein by reference.

BACKGROUND OF THE INVENTION

(a) Field of the Invention

The present disclosure relates to a mat, and more particularly, to a mat that may be relieved because it is not harmful to health of a companion animal even when the companion animal bites the mat and consumes contents thereof by manufacturing the mat for the companion animal with an edible component.

(b) Description of the Related Art

As hot weather continues due to the recent global warming, a daytime peak temperature exceeding 40° C. frequently appears. Due to such high temperature weather, a companion animal such as a pet dog may be unguardedly exposed to risks of heat stroke, burns, and the like.

A normal body temperature of a dog and a cat is about 37.5 to 39.5° C., which is 2 to 3° C. higher than that of the human. Unlike the human, the dog and the cat do not have sweat glands in their bodies except for the tongue and soles, so their ability to control the body temperature is more vulnerable than that of the human.

However, most of companion animal products are manufactured in a state that does not reflect a measure for such high temperature weather. Particularly, the mat was manufactured without preparation for high temperature although the companion animal uses the mat for a long period of time.

That is, since the mat is made of a general PE material, the mat may have a fatal effect on the body temperature of the companion animal when the temperature rises.

In addition, the companion animal tends to habitually bite the mat. In this case, mat pieces are introduced into the body of the companion animal, which is harmful to health of the companion animal.

Particularly, in a case of a general polymer gel, the gel absorbs moisture in the body of the companion animal thereby expanding up to about 50 times in volume, and has an adsorbing property thereby sticking to the digestive system, which may be fatal to health of the companion animal.

An example of the related art includes Korean Patent Application No. 10-2012-0079454 (title of the Invention: Rug for pet).

SUMMARY OF THE INVENTION

The present disclosure provides a mat that is not harmful to health of a companion animal by manufacturing the mat with an edible material even if the companion animal bites the mat and pieces thereof are introduced into the body of the companion animal.

The present disclosure also provides a mat that may effectively cope with a case of high temperature by manufacturing the mat from a material capable of maintaining a low temperature state of a component of the mat.

According to an embodiment of the present disclosure, there is provided a mat for a companion animal, and the mat includes an outer cover surrounding an outside of the mat; a double-layered fabric disposed on an inside of the outer cover to prevent contraction or bursting thereof; a cool gel made of an edible material, which is disposed on an inside of the double-layered fabric to maintain a low temperature state thereof; and coating layers coated on a surface of the outer cover.

According to another embodiment of the present disclosure, there is provided a method of manufacturing a mat for a companion animal, and the method includes manufacturing an outer cover by displaying a design on a fabric made of synthetic resin; coating a surface of the outer cover with a water repellent layer and a PU layer; manufacturing a double-layered fabric and disposing the double-layered fabric on an inside of the outer cover to be compressed; compressing upper and lower portions of the outer cover at a high frequency; manufacturing and injecting a cool gel liquid made of an edible material into the inside the double-layered fabric for maintaining a low temperature state; and forming a border by sewing an edge of the outer cover.

The present disclosure described above has the following advantages.

First, the mat is manufactured by an edible material, so that there is an advantage that the mat is not harmful to health of the companion animal even if the companion animal bites the mat and contents thereof are introduced into the body of the companion animal.

Second, the mat is manufactured by a material capable of maintaining a low temperature state of the mat, so that there is an advantage that it is possible to effectively cope with a case of a high temperature.

Third, the components of the mat are improved, there is an advantage of preventing mold growth.

Fourth, the phytoncide component is applied to the mat, so that there is an advantage that sterilization may be increased and mite breeding may be suppressed.

DETAILED DESCRIPTION OF THE EMBODIMENTS

Figure 1:
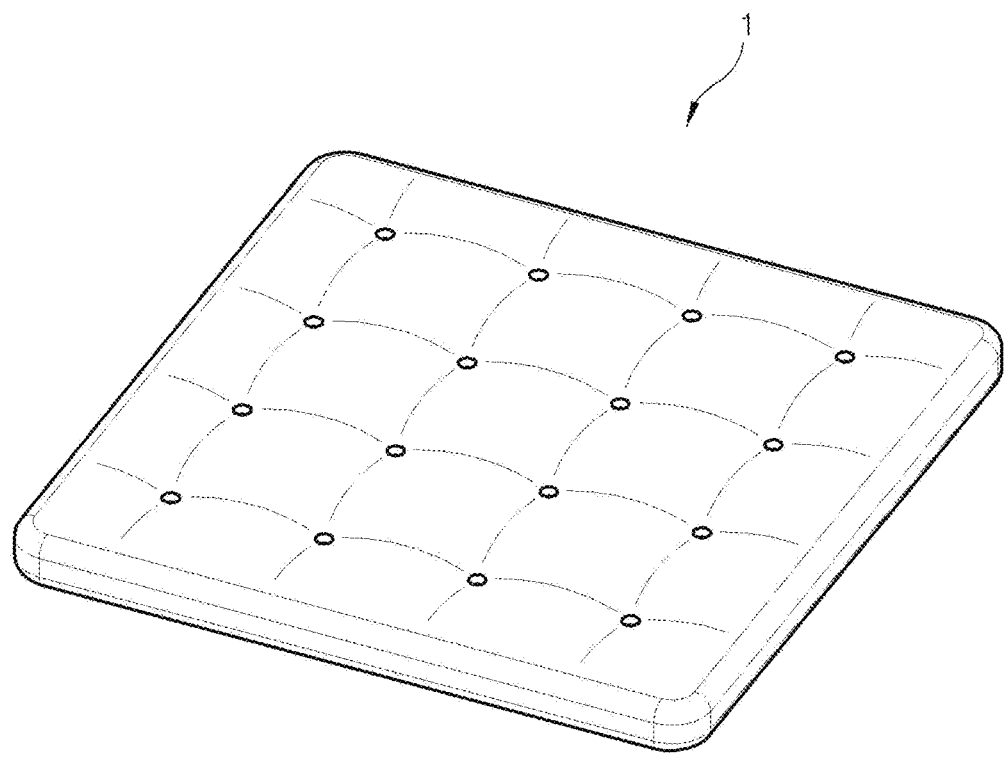
FIG. 1 is a perspective view illustrating an appearance of a mat according to an example of the present disclosure.
Figure 2:
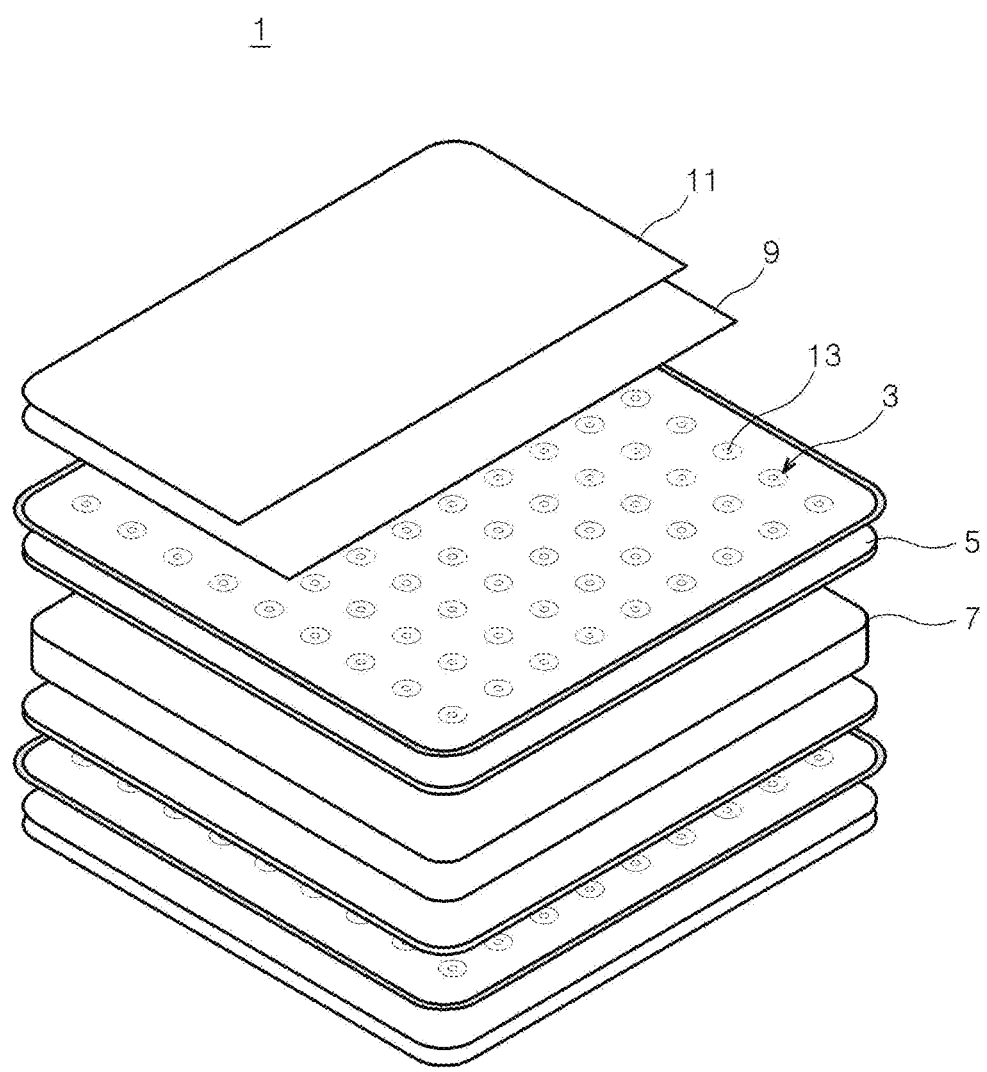
FIG. 2 is an exploded perspective view illustrating a structure of the mat illustrated in FIG. 1.
Figure 3:
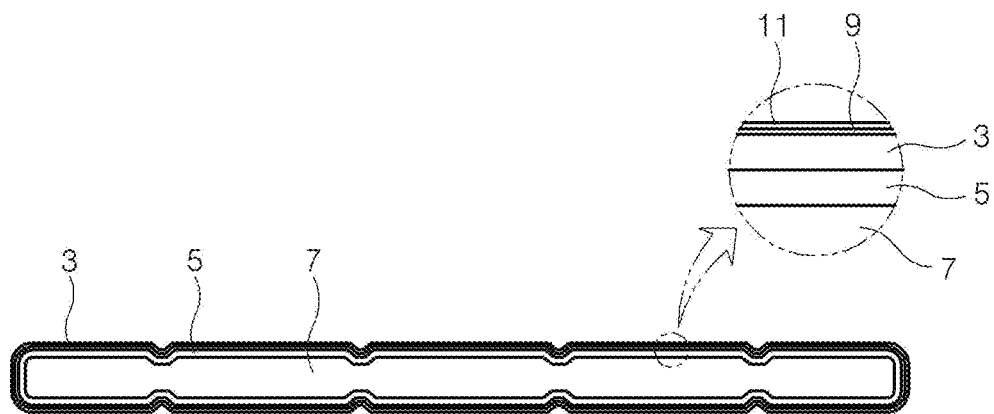
FIG. 3 is a side view of the mat illustrated in FIG. 1.
Figure 4:
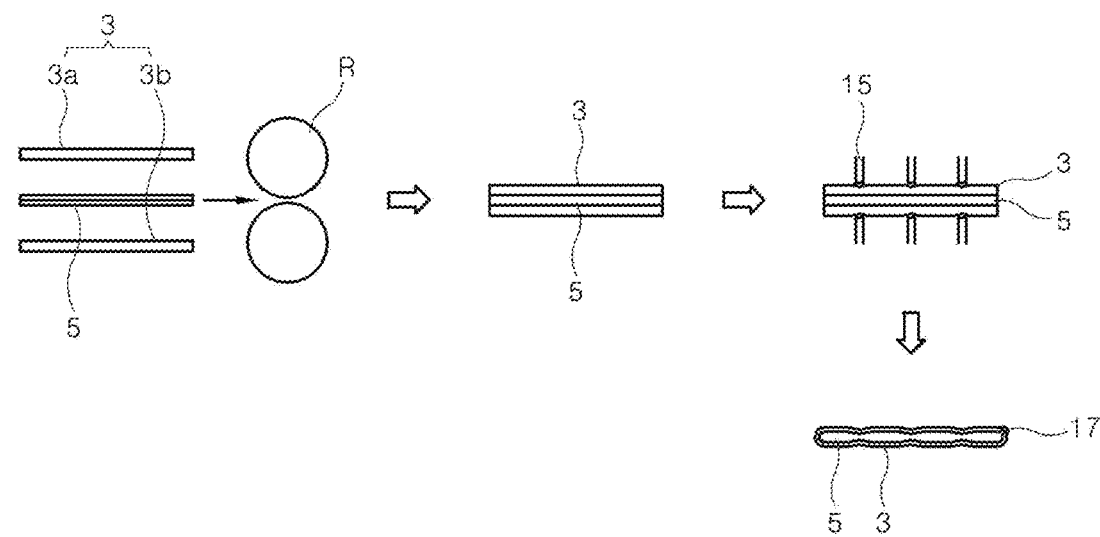
FIG. 4 is a diagram schematically illustrating a process sequence of manufacturing the mat illustrated in FIG. 1.

Hereinafter, a mat for a companion animal according to an example of the present disclosure will be described in detail with reference to the accompanying drawings.

As illustrated in FIGS. 1 to 4, a mat 1 proposed by the present disclosure is preferably a mat applied to a companion animal, and may be used by a dog, a cat, and the like.

Such a mat 1 includes an outer cover 3 surrounding an outside of the mat 1; a double-layered fabric 5 disposed on an inside of the outer cover 3 to prevent contraction or bursting thereof; an edible cool gel 7 disposed on an inside of the double-layered fabric 5 to maintain a low temperature state; and coating layers 9 and 11 coated on a surface of the outer cover 3.

When describing in more detail the mat having such a structure, the outer cover 3 may be made of fabric of various materials, and for example, a microfiber material may be applied.

All sides of the outer cover 3 are surrounded, and the double-layered fabric 5 is disposed on the inside thereof.

The *352 polycarbonate fabric 5 may be configured of various materials, for example, is made of a polyvinyl chloride (PVC) material, and contraction or bursting may be prevented by disposing two layers of a film made of the PVC material.

The cool gel 7 is disposed on the inside of the double-layered fabric 5 so that the mat may be maintained at a low temperature and may be edible.

In more detail, the cool gel 7 is formed by mixing purified water, propylene glycol (PG), carboxymethyl cellulose, cypress water, and sodium benzoate in certain ratios, and filling with them on the inside of the outer cover 3 made of the PVC coated fabric.

The PVC coated fabric is a fabric coated with polyvinyl chloride (PVC) on the surface of the fabric, and PVC is one of thermoplastic plastics, is a plasticine mainly composed of vinyl chloride, and is also called polyvinyl chloride or vinyl chloride resin.

In addition, purified water refers to ultrapure water, distilled water, or ion exchanged water, and is water from which all impurities such as ions, solid particles, microorganisms, organic substances, and dissolved gases contained in water are removed. Such purified water serves to dissolve other components.

Propylene glycol (PG) is a main component of the cool gel with a chemical formula of C3H8O2, a specific gravity of 1.036 to 1.040 or less, and a boiling point of 185 to 189° C. Propylene glycol is mixed with water, alcohol, acetone, ethyl acetate, chloroform, ether, and the like, dissolves gasoline, and is not mixed with petroleum ether or paraffin. PG is used as a food solvent because PG may prevent the propagation of mold and does not ferment. PG is also used as a food extender of bread and is used as a preservative and sterilization of air.

In addition, carboxymethyl cellulose (CMC) is a substance (celluose-O—CH2COOH) obtained by substituting a carboxymethyl group (—CH2COOH) for a hydroxy group (cellulose-OH) at a C6 position of a glucose residue constituting cellulose.

The CMC is water soluble cellulose having 0.8 or less sodium glycolate and ether groups per unit (C6) of the cellulose molecule. When being dissolved in water, CMC becomes a sticky liquid, and may be stored for a long period of time because of having a property of preventing mold or rot.

In addition, since CMC is viscous, CMC is mixed with other components, and thereby the mat may maintain cushioning feeling.

In addition, cypress water is a liquid extracted from a cypress tree and has a high phytoncide content. Such cypress water may be prepared by injecting a cypress raw material into a heater and applying heat to extract pure steam. Such cypress water is used as a deodorant and disinfectant, and has effects of fungal inhibition, stress relief, and nerve stability.

In addition, sodium benzoate also refers to sodium benzene carboxylic acid.

This sodium benzoate is white crystalline powder and precipitates if the solution is concentrated by neutralizing benzoic acid with sodium hydroxide. The melting point thereof is 300° C. and sodium benzoate is used as a preservative because it suppresses mold.

On the other hand, the components of the above described cool gel may be mixed in various ratios, and as an example, 40 to 50% by weight of purified water, 15 to 25% by weight of PG, 10 to 50% by weight of CMC, 2 to 8% by weight of cypress water, and 0.001 to 0.05% by weight of sodium benzoate are mixed.

In these components, the content of PG is 15 to 25% by weight. In a case where mixing is performed with the content of PG of 15% by weight or less, the antiseptic effect is small because mold propagates a standard range or more, and in a case where mixing is performed within the content range of PG of 25% by weight, the mold does not propagate, and thereby there is the antiseptic effect. Therefore, the content of PG is preferably in the range of 15 to 25% by weight.

Figure 5:
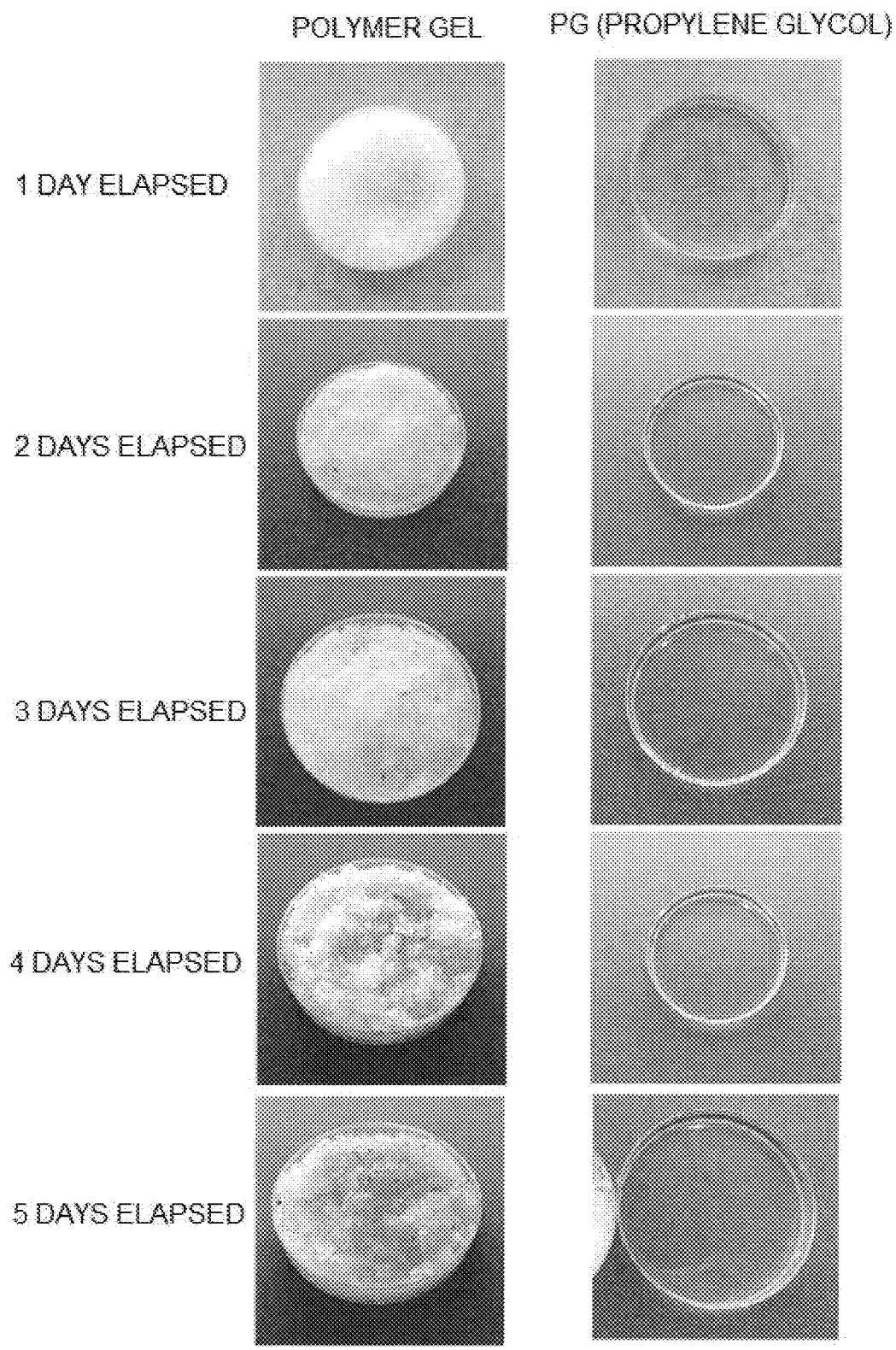
FIG. 5 is each photograph illustrating results of testing a mold antiseptic effect of a PG component of a cool gel layer of the mat illustrated in FIG. 2.

FIG. 5 illustrates photographic data in tests of the mold antiseptic effect of PG. It illustrates results of the tests with a general polymer gel and PG of the present disclosure at room temperature for 5 days.

As results of the tests, in the case of PG, mold was hardly observed over time, whereas in the case of the general polymer gel, it was observed that mold gradually increased.

The content of CMC was 10 to 50% by weight, and in a case where mixing was performed with the content of CMC of 10% by weight or less, the viscosity was low and the antiseptic effect was small, whereas in a case where mixing was performed within the content range of CMC of 50% by weight, the viscosity was appropriate, and thereby the shape of the cool gel might be smoothly maintained and there was also an antiseptic effect.

In addition, the content of cypress water was 2 to 8% by weight. In a case where mixing was performed with the content of cypress water of 2% by weight or less, the deodorization and sterilization effects were low, whereas in a case where mixing was performed within the content range of cypress water of 8% by weight, the deodorization and sterilization effects were adequate.

The content of sodium benzoate was 0.001 to 0.05% by weight. In a case where mixing was performed with the content of sodium benzoate of 0.001% by weight or less, the antiseptic effect was small, and in a case where mixing was performed within the content range of 0.05% by weight, there was an antiseptic effect.

In this way, by mixing purified water, PG, CMC, cypress water, and sodium benzoate and filling the inside of the PVC coated fabric of the cool gel with them, it is possible to maintain a low temperature state while achieving the antiseptic effect and sterilization and maintaining the deodorization state.

On the other hand, as another example of the present disclosure, glycerin may be added in place of PG.

In more detail, as in the previous example, the cool gel 7 has a difference in that purified water, CMC, cypress water, and sodium benzoate are mixed in certain ratios, and glycerin (glycerophosphoric acid) is added.

Glycerin uses in which a concentration of an oil and fat component is 10% or less, and absorbs moisture in the air in a high humidity environment because of having strong absorption if the concentration thereof is excessive.

As described above, in a case where glycerin is additionally mixed, the components of the cool gel may be mixed in various ratios. As an example, the components are mixed in ratios of 40 to 50% by weight of purified water, 15 to 25% by weight of glycerin, 10 to 50% by weight of CMC, 2 to 8% by weight of cypress water, and 0.001 to 0.05% by weight of sodium benzoate.

In this case, the content of glycerin was 15 to 25% by weight. In a case where mixing is performed with the content of glycerin of 15% by weight or less, the moisturizing effect was small, and in a case where mixing is performed within the content range of glycerin of 25% by weight, there was a moisturizing effect.

On the other hand, coating layers 9 and 11 are formed on the surface of the outer cover 3. Various layers may be stacked on the coating layers 9 and 11. For example, the polyurethane (PU) layer 9 and the water repellent layer 11 may be formed.

The PU layer 9, that is, the polyurethane layer refers to a polymer produced by repeatedly making urethane groups through an addition reaction between alcohol and isocyanate.

The PU layer 9 exhibits resistance to solvent decomposition and has excellent impact properties, and this coating is used on a surface requiring chemical resistance such as abrasion resistance, flexibility, good curing, and adhesion. Particularly, it has an effect of softening the texture of the surface of the cool mat fabric.

In addition, the water repellent layer 11 may be formed by coating with a silicone-based or fluorine-based water repellent component.

In this way, by coating the surface of the outer cover 3 of the mat with the water repellent layer 11 and the PU layer 9, it is possible to obtain an appropriate elastic force and a water repellent effect.

In addition, the durability may be improved by pressing a plurality of locations on the surface of the outer cover 3 by a press or the like.

In addition, the mat having these components may be used not only for the companion animal, but also may be used in other fields.

Hereinafter, a manufacturing method of a mat according to an example of the present disclosure will be described in more detail with reference to the accompanying drawing.

Figure 6:
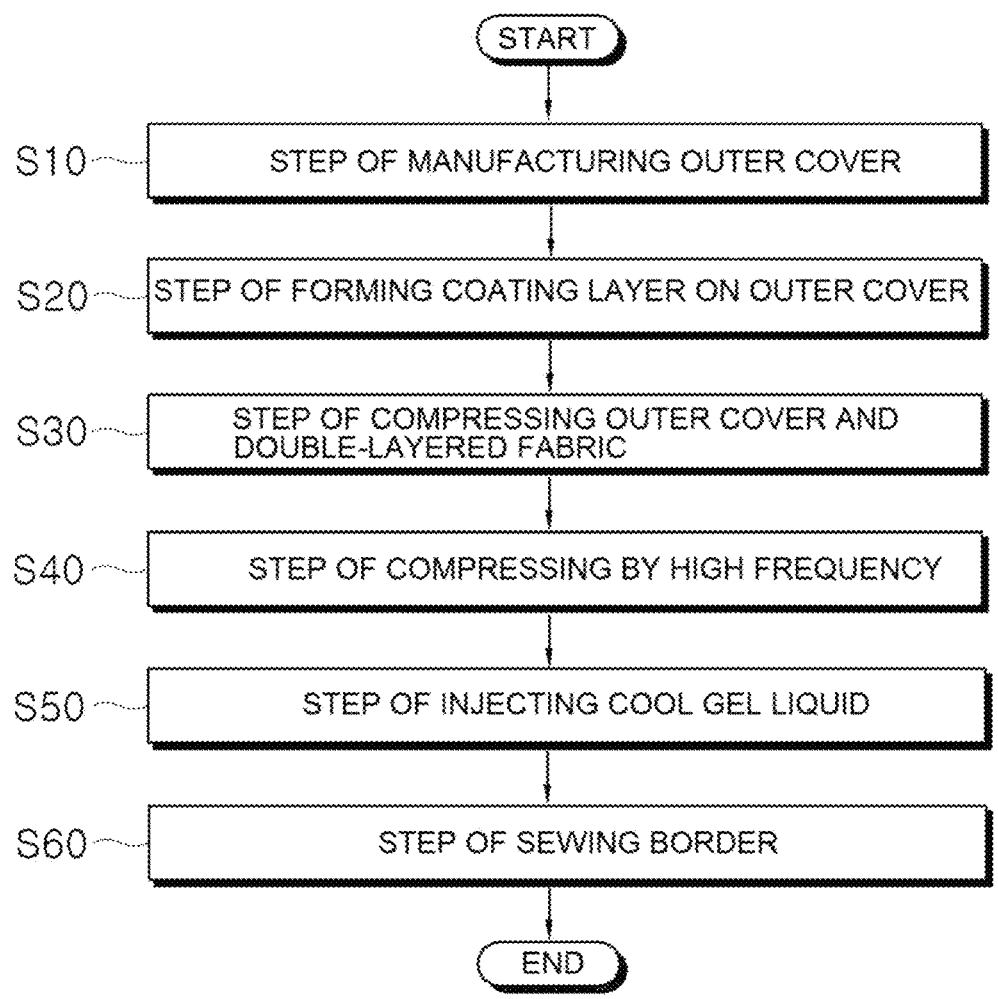
FIG. 6 is a flowchart illustrating a manufacturing method of a mat according to another example of the present disclosure.

As illustrated in FIG. 6, the manufacturing method of the mat proposed by the present disclosure, includes a first step S10 of manufacturing the outer cover by displaying a design on the fabric made of synthetic resin; a second step S20 of coating the surface of the outer cover 3 with the water repellent layer 11 and the PU layer 9; a third step S30 of manufacturing the double-layered fabric 5 and disposing the double-layered fabric 5 on the inside of the outer cover to be compressed; a fourth step S40 of compressing the upper and lower portions of the outer cover by a high frequency; a fifth step S50 of manufacturing and injecting the cool gel liquid made of an edible material into the inside the double-layered fabric 5 for maintaining a low temperature state; and a sixth step S60 of forming a border by sewing the edge of the outer cover 3.

In this manufacturing method of the mat, in the first step S10, the design is displayed on the fabric made of synthetic resin to manufacture the outer cover. That is, the outer cover 3 is configured of two layers of upper and lower layers 3a and 3b, and fabrics of various materials are possible. For example, fabric made of microfibers may be applied.

Then, a character design is displayed on the surface of the outer cover 3 and for example, is printed by a real photo.

In the second step S20, surfaces of the upper and lower two layers 3a and 3b of the outer cover 3 are coated with the water repellent layer 11 and the PU layer 9.

That is, the surface of the outer cover 3 is coated with the PU layer 9 by a coating machine to have appropriate elasticity.

Then, the water repellent layer 11 is additionally formed on the surface of the outer cover 3 coated with the PU layer 9 by the coating machine. In this way, by coating the surface of the outer cover 3 of the mat with the water repellent layer 11 and the PU layer 9, it is possible to obtain an appropriate elastic force and water repellent effect.

After the second step S20 is completed, the third step S30 proceeds. In this step, the double-layered fabric 5 is manufactured, disposed on the inside of the outer cover, and then pressed by a roller.

That is, the double-layered fabric 5 has a pocket shape in which a PVC film is disposed in two layers, and is filled with the cool gel liquid inside thereof. In addition, this double-layered fabric 5 is inserted into the inside of the outer cover 3.

As described above, the double-layered fabric 5 passes between a pair of rollers R in a state of being disposed between the upper and lower double layers 3a and 3b of the outer cover 3.

In this case, the pair of rollers R compresses the outer cover and the double-layered fabric by a compression method by predetermined heat.

Then, in the fourth step S40, the upper and lower portions of the outer cover are compressed by high frequency. That is, by pressing the mat at a plurality of places by a high frequency press or the like, the outer cover 3 and the double-layered fabric 5 come into contact with each other and are fused.

After the fourth step S40 is completed, the fifth step S50 proceeds. In this step, the cool gel liquid made of an edible material that maintains a low temperature state is manufactured and injected into the inside of the double-layered fabric 5.

That is, the cool gel liquid is manufactured by mixing the components in ratios of 40 to 50% by weight of purified water, 15 to 25% by weight of PG, 10 to 50% by weight of CMC, 2 to 8% by weight of cypress water, and 0.001 to 0.05% by weight of sodium benzoate.

Therefore, the cool gel liquid configured of these components may maintain a low temperature state, is edible, and is not harmful to the health of the companion animal even if the companion animal bites mat.

Then, the inside of the double-layered fabric 5 is filled with the cool gel liquid through an inlet 17 disposed on one side of the double-layered fabric 5. After the inside of the double-layered fabric 5 is filled with the cool gel liquid, the inlet 17 is compressed and sealed with a high frequency or the like.

As described above, after the inside of the double-layered fabric 5 is filled with the cool gel liquid, the step S60 proceeds to seal the board by sewing the edge of the outer cover 3 by a sewing machine or the like.

While going through these steps, the mat has an appropriate volume by disposing the double-layered fabric 5 therein, so that the mat for the companion animal may be manufactured.

What is claimed is:

1. A mat for a companion animal, the mat comprising:
an outer cover made of a fabric material coated with a polyvinyl chloride (PVC) resin;
a double-layered fabric disposed on a side of the outer cover to prevent contraction or bursting thereof;
a polyurethane (PU) layer that is coated on another side of the outer cover and has elasticity;
a silicone-based or fluorine-based water repellent layer coated on the polyurethane layer and has water repellency; and
a cool gel made of an edible material, which is disposed on an inside of the double-layered fabric;
wherein the cool gel is obtained by mixing in ratios of 40 to 50% by weight of purified water, 15 to 25% by weight of propylene glycol, 10 to 50% by weight of carboxymethyl cellulose, 2 to 8% by weight of cypress water, and 0.001 to 0.05% by weight of sodium benzoate.

2. A mat for a companion animal, the mat comprising:
an outer cover made of a fabric material coated with a polyvinyl chloride (PVC) resin;
a double-layered fabric disposed on a side of the outer cover;
a polyurethane (PU) layer that is coated on another side of the outer cover and has elasticity;
a silicone-based or fluorine-based water repellent layer coated on the polyurethane layer and has water repellency; and
a cool gel made of an edible material, disposed on an inside of the double-layered fabric, and maintains a low temperature;
wherein the cool gel is obtained by mixing in ratios of 40 to 50% by weight of purified water, 15 to 25% by weight of glycerin, 10 to 50% by weight of carboxymethyl cellulose (CMC), 2 to 8% by weight of cypress water, and 0.001 to 0.05% by weight of sodium benzoate.

* * * * *